US009420680B2

(12) United States Patent
Kusano

(10) Patent No.: US 9,420,680 B2
(45) Date of Patent: Aug. 16, 2016

(54) APPARATUS AND A METHOD AND A SYSTEM FOR TREATING A SURFACE WITH AT LEAST ONE GLIDING ARC SOURCE

(75) Inventor: Yukihiro Kusano, Roskilde (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 752 days.

(21) Appl. No.: 13/516,156

(22) PCT Filed: Dec. 14, 2010

(86) PCT No.: PCT/EP2010/069587
§ 371 (c)(1), (2), (4) Date: Aug. 28, 2012

(87) PCT Pub. No.: WO2011/073170
PCT Pub. Date: Jun. 23, 2011

(65) Prior Publication Data

US 2013/0015159 A1 Jan. 17, 2013

Related U.S. Application Data

(60) Provisional application No. 61/286,570, filed on Dec. 15, 2009.

(30) Foreign Application Priority Data

Dec. 15, 2009 (EP) .................................... 09179277

(51) Int. Cl.
*B23K 10/00* (2006.01)
*H05H 1/48* (2006.01)

(52) U.S. Cl.
CPC ...................................... *H05H 1/48* (2013.01)

(58) Field of Classification Search
CPC .............. H05H 1/46; H05H 1/26; H05H 1/28
USPC .............. 219/121.45, 121.36, 121.48, 121.49
See application file for complete search history.

(56) References Cited

U.S. PATENT DOCUMENTS 4,918,283 A * 4/1990 Yamade et al. .......... 219/121.46
5,262,616 A * 11/1993 Labrot et al. ............ 219/121.49
5,481,080 A * 1/1996 Lynum et al. ............ 219/121.48
5,688,417 A * 11/1997 Cadre et al. .............. 219/121.52
5,695,664 A * 12/1997 Loubet et al. ............ 219/121.52
5,726,414 A * 3/1998 Kitahashi et al. ........ 219/121.48
6,008,464 A * 12/1999 Donnart et al. .......... 219/121.54
6,236,013 B1 5/2001 Delzenne (Continued)

OTHER PUBLICATIONS

Kusano, Y. et al., "Gliding arc discharge: application for adhesion improvement of fibre reinforced polyester composites", Surface and Coatings Technology, 2008; 202 (22-23): 5579-5582.

(Continued)

*Primary Examiner* — Mark Paschall
(74) *Attorney, Agent, or Firm* — Polsinelli PC; Ron Galant

(57) ABSTRACT

The invention relates to an apparatus for treating a surface with a at least one gliding arc source comprising at least one gas flow controlling unit (104); and a set of electrodes (102); wherein the at least one gas flow controlling unit (104) and the set of electrodes (102) are controlled to provide a plasma comprising a gas temperature at the set of electrodes (102) above approximately 2000 K. In this way, an optimal or substantially optimal plasma for treating surfaces of samples is achieved.

24 Claims, 8 Drawing Sheets

(56) References Cited

U.S. PATENT DOCUMENTS

| | | | | |
|---|---|---|---|---|
| 8,536,481 | B2 * | 9/2013 | Kong et al. | 219/100 |
| 2006/0266637 | A1 * | 11/2006 | Gutsol et al. | 204/164 |
| 2010/0219136 | A1 * | 9/2010 | Campbell et al. | 210/748.01 |
| 2012/0296265 | A1 * | 11/2012 | Dobrynin et al. | 604/23 |

OTHER PUBLICATIONS

Prysiazhnevych, et al.: "Study of non-isothermality of atmospheric plasma in transverse arc discharge", UKR. Journal of Physics, 2007; 52(11): 1061-1067.

Pellerin, S., et al., "Heat String Model of Bi-Dimensional dc Glidarc", J. Phys. D: Appl. Phys., 2000, 33: 2407-2419.

Toshifuji, Jungo, et al., "Cold Arc-Plasma Jet Under Atmospheric Pressure for Surface Modification", Surface and Coatings Technology 2003; 171 (1-37): 302-306.

Fridman, Alexander, et al., "Gliding Arc Gas Discharge", Progress in Energy and Combustion Science 1999; 25: 211-231.

Tendero, C., et al., "Atmospheric pressure plasmas: A review," Spectrochimica Acta Part B 61 pp. 2-30 (2006).

Kusano, Y., et al., "Observation of gliding arc surface treatment," Surface Engineering, vol. 31, No. 4, pp. 282-288 (2015).

* cited by examiner

APPARATUS AND A METHOD AND A SYSTEM FOR TREATING A SURFACE WITH AT LEAST ONE GLIDING ARC SOURCE

CROSS-REFERENCE TO RELATED APPLICATIONS

This is the national stage of International Application No. PCT/EP2010/069587, filed on Dec. 14, 2010, which claims the benefit of U.S. Provisional Patent Application No. 61/286,570, filed on Dec. 15, 2009, and European Patent Application No. 09179277.0, filed on Dec. 15, 2009, the contents of all of which are hereby incorporated herein by reference.

FIELD OF THE INVENTION

The invention relates to an apparatus for treating a surface with at least one gliding arc source. The invention further relates to a corresponding method and system.

BACKGROUND OF THE INVENTION

Non-equilibrium plasmas are preferably used for surface treatment in industry. In order to increase efficiency of the surface treatment, a gliding arc may be utilized whereby the power of the plasma may be increased by keeping the non-equilibrium condition, see e.g. A. Fridman et al., "Gliding arc discharge", Progress in Energy and Combustion Science 25, (1999), pages 211-231.

Existing gliding arcs yield a problem that the advantages of gliding arcs are not effectively used, and thereby the resulting surface treatment effect is insufficient. For example, the extension (or length) of the discharge of prior art gliding arcs is very limited which reduces their applicability for the object with a variety of sizes and shapes.

SUMMARY OF THE INVENTION

According to one aspect, disclosed herein is an apparatus for treating a surface with at least one gliding arc source comprising at least one gas flow controlling unit and a set of electrodes for providing a plasma;

a cooling unit for providing a cooling fluid, and a high voltage power supply for generating a discharge;

wherein at least one of the electrodes comprises a tubular portion fluidly coupled to the cooling unit, and wherein the tubular portion comprises, at least along a portion of its outer surface, a protrusion configured to lower the voltage applied to the electrodes required to ignite the plasma.

Hence, an efficient cooling of the electrodes is provided while ensuring an efficient plasma generation.

Alternatively or additionally to provide a protrusion, at least one of the electrodes may comprise a tubular portion fluidly coupled to the cooling unit 201, wherein the electrode further comprises an outer surface comprising at least one portion facing the other one of the electrodes; wherein an intersection of said at least one portion of the outer surface of the electrode with a plane normal to a longitudinal direction of the electrode has a curvature with a radius of curvature less than 3 mm. For example, the tubular portion may define said longitudinal direction. Said portion of the outer surface may thus be curved in a plane normal to said longitudinal direction and have a radius of curvature smaller than 3 mm, preferably smaller than 2 mm.

For example the electrode may be formed as a tube having a radius no larger than 3 mm. Alternatively, the electrode may comprise a tubular portion, e.g. a tubular portion with a radius no less than 3 mm, and a protrusion extending radially from the tubular portion where the protrusion has a radially outward edge portion. The edge portion may be curved in a plane normal to said longitudinal direction and have a radius of curvature smaller than 3 mm, preferably smaller than 2 mm.

According to another aspect, disclosed herein is an apparatus for treating a surface with at least one gliding arc source comprising at least one gas flow controlling unit and a set of electrodes for providing a plasma;

a cooling unit for supplying a cooling fluid;

a high voltage power supply for generating a discharge a control unit adapted to control at least the cooling unit;

a sensor adapted to measure a parameter indicative of the resistance of at least one of the electrodes, a computational unit communicatively coupled to the sensor;

wherein the computational unit is adapted to calculate a feedback signal based on the measured parameter; and wherein the control unit is adapted to control the power supply and/or the cooling unit responsive to the calculated feed back signal. The computational unit may be an integral part of the control unit or it may be embodied as a separate unit. Accordingly, the computational unit may be communicatively coupled to the control unit, e.g. via an internal communication such as a bus of the control unit and/or via an external communications interface between the computational unit and the control unit. In some embodiments, the computational unit and/or the control unit may further be communicatively coupled to the power supply. It will generally be appreciated that some or all of the various units of the apparatus described herein, e.g. the control unit, the computational unit, the sensor, the gas flow controlling unit, the cooling unit, etc. may be integrated into a single unit, suitably communicatively interconnected by internal communications means of the integrated unit.

Hence, an efficient control of the electrodes is provided while ensuring an efficient plasma generation.

According to yet another aspect, disclosed herein is an apparatus for treating a surface with at least one gliding arc source comprising at least one gas flow controlling unit for each gliding arc source; and a set of electrodes; wherein the at least one gas flow controlling unit and the set of electrodes are controlled to provide a plasma comprising a rotational temperature at the point of arc ignition above approximately 2000K and more preferably above 3000K.

Thereby is achieved a plasma with an optimal or substantially optimal plasma for treating surfaces of samples.

Embodiments of the present invention also relates to a method corresponding to embodiments of the device.

More specifically, according to one aspect, the invention relates to a method of treating a surface with at least one gliding arc source comprising controlling at least one gas flow controlling unit and controlling a set of electrodes; and providing a plasma via the at least one gas flow controlling unit and the set of electrodes; and controlling the plasma to comprise a rotational temperature at the point of arc ignition above approximately 2000K and more preferably 3000K.

The method and embodiments thereof correspond to the device and embodiments thereof and have the same advantages for the same reasons.

Embodiments of the present invention also relate to a system corresponding to embodiments of the device.

More specifically, the invention relates to a system for treating a surface with at least one gliding arc source comprising an apparatus according to an embodiment of the invention and a sample, wherein the apparatus is adapted to provide a plasma to treat the sample surface.

In some embodiments, at least one of the electrodes comprises a tube having a first end and a second end wherein the tube is configured to receive, during operation a coolant at said first end and discharge the coolant at said second end, wherein the centre of the cross-section of the tube at the first end is displaced relative to the centre of the cross-section of the tube at the second end.

The cross section of the tube may have any shape such as round or rectangular. The cross section of the tube may have a width between 1 mm and 50 cm, between 0.5 cm and 20 cm, between 1 cm and 10 cm or between 2 cm and 8 cm. The cross section of the tube includes a portion facing the other electrode and the plasma. At least a part of this portion may be curved with a radius of curvature less than 3 mm, e.g. less than 2 mm. Both electrodes may comprise a tube.

The tube may have approximately a U shape where the first end and the second end are positioned at the upper part of the U approximately at the same height.

Consequently, an electrode is provided capable of being efficiently cooled by circulating coolant. The flow resistance is lowered allowing an even better cooling by designing the electrode as a tube with a larger inner diameter.

In some embodiments, at least one of the electrodes comprises a tubular portion wherein the tubular portion, at least along a portion of its outer surface, comprises a protrusion configured to lower the needed voltage applied to the electrodes to ignite the plasma, relatively to the needed voltage when the at least one electrode does not comprise said protrusion.

The protrusion may be an elongated, flat, e.g. blade-shaped, element elongated along the longitudinal direction of the electrode and having a width at an end distal to the electrode, which width is smaller than its longitudinal dimension and smaller than the height of the protrusion. Generally, the protrusion may extend along at least a portion of the outer surface of the tubular portion. The protrusion may project from the outer surface of the tubular portion towards the other electrode and the plasma, thus defining at least one edge portion facing the other electrode. The edge portion may be round and have a radius of curvature less than 3 mm, e.g. less than 2 mm. The radius of curvature may be measured in an intersection of the protrusion with a cross-sectional plane of the electrode normal to the longitudinal direction of the electrode.

The electrode protrusion e.g. electrode attachment, may protrude in a direction approximately towards the other electrode. The electrode protrusion may protrude with a height of at least 1 mm, 2 mm, 5 mm, 1 cm, 2 cm, 5 cm, or 10 cm. The electrode attachment may protrude with a height no more than 20 cm, 10 cm, 5 cm, 2 cm, 1 cm, or 5 mm.

The electrode protrusion may have a shape such that the intensity of the electric field around the part of the electrode comprising the protrusion is increased relatively to the intensity of electrical field of the same part of the electrode if the protrusion where removed, when a voltage is applied, whereby the voltage needed to ignite the plasma is lowered.

The electrode protrusion may be attached to the tubular portion after the tubular portion is formed or the tubular portion and the attachment may be formed as an integral body. It will further be appreciated that more than one protrusion, e.g. more than one attachment, may be provided at each electrode.

In some embodiments, the attachment, the blades and/or the protrusion may be directly cooled by circulating fluid.

In some embodiments, a cross section of the tubular portion being perpendicular to the longitudinal direction of the tubular portion, comprising a part of the electrode protrusion, may have a shape such that a first surface area defined between a first line and a second line originating in the centre of said cross section is at least a factor A larger than a second surface area defined between said second line and a third line originating in said centre, wherein the angle between said first and said second line, and said second line and said third line is B, wherein the first and the second line is positioned so that the first surface area comprises the electrode protrusion, and the third line is positioned so that the first surface area and the second surface area do not overlap.

A may be chosen from approximately 1.1, 1.5, 2, 3, 4, 5, or 10, and B may be chosen from approximately 180 degrees, 135 degrees, 90 degrees, 45 degrees, 30 degrees, 20, degrees, 10 degrees, or 5 degrees.

In some embodiments, the apparatus further comprises a computational unit communicatively coupled to the control unit via a first communication link and to a sensor via a second communication link, wherein said sensor is adapted to measure a parameter indicative of the resistance of at least one of the electrodes, and where the computational unit is adapted to calculate a feedback signal based on the measured parameter wherein the computational unit is further adapted to transmit the feedback signal to the control unit wherein the control unit is adapted to control the cooling unit responsive to the received feed back signal such that the cooling unit is controllable via a feedback loop. Additionally or alternatively, the computational unit may be adapted to calculate a feedback signal based on the measured parameter wherein the computational unit is further adapted to feed the feedback signal to the control unit wherein the control unit is adapted to control the power supply responsive to the received feedback signal such that the power supply is controllable via a feedback loop.

The parameter may be the temperature of the electrode, or the resistance of the electrode. The temperature of the electrode may be measured by attaching a temperature sensor to the electrode and/or measuring the Infra red and/or visible radiation from the electrode. The temperature of the electrodes may also be estimated by the temperatures of the fluid (coolant) before and after cooling the electrodes, or by measuring the temperature of the sample 112. The feedback signal may be generated securing that the resistance of the electrode is maintained below a predetermined value e.g. two or three times larger resistance than the resistance at room temperature, if the temperature of the electrode increases the feedback signal may secure that cooling unit cools the electrode more e.g. by increasing the flow rate of the coolant and/or decreasing the temperature of the coolant. Correspondingly, if the temperature of electrode decreases the feedback signal may cause the cooling unit to cool the electrode less e.g. by decreasing the flow rate of the coolant and/or increasing the temperature of the coolant. As the resistance and the temperature of an electrode normally have an approximately linear relationship the feedback signal may be generated securing that the temperature of the bulk part of the electrode is not raised with more than $3/\alpha$ from room temperature (e.g. from 20 degrees Celsius), where a is the temperature coefficient of the linear relationship between the resistance and temperature. For copper and aluminium $3/\alpha$ is approximately 769 degrees Celsius, and for tungsten it is 667 degrees Celsius. The feedback signal may be generated securing that the temperature of the electrode is not raised with more than $2/\alpha$ from room temperature, where $\alpha$ is the temperature coefficient of the linear relationship between the resistance and temperature. For copper and aluminium 2/α is approximately 513 degrees Celsius, for tungsten it is 444 degrees Celsius, and for stainless steel it is 2000 degrees Celsius. The feedback signal may be generated securing that the temperature of the electrode is not raised with more than 1/α from room temperature, where α is the temperature coefficient of the linear relationship between the resistance and temperature. For copper and aluminium 1/α is approximately 256 degrees Celsius, for tungsten it is 222 degrees Celsius, and for stainless steel it is 1000 degrees Celsius.

DETAILED DESCRIPTION OF THE DRAWINGS

Figure 1:
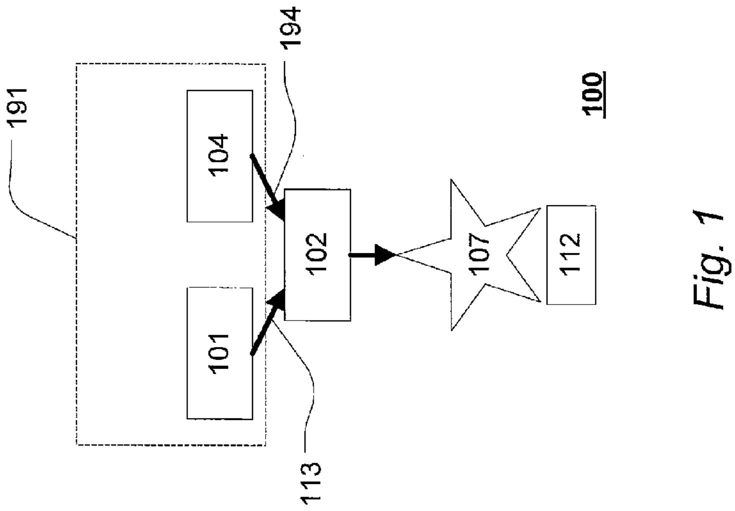
FIG. 1 shows an embodiment of a device for generating at least one gliding arc plasma.

FIG. 1 shows an embodiment of a device 100 for generating at least one gliding arc plasma 107 such as one gliding arc plasma or a plurality of gliding arc plasmas. The device 100 may comprise a gas flow controlling unit 104, a set of electrodes 102 and a power supply 101.

The gas flow controlling unit 104 may be exemplified as a needle valve, which is able to regulate the flow, or a float type flow meter, which is able to regulate the flow and measure the flow, or a mass flow controller, which is able to regulate the flow via an external electric signal and to measure the flow.

In an embodiment, the gas flow controlling unit 104 may comprise a plurality of flow meters such as a flow meter for each gas component in a multiple component gas mixture. For example, the gas flow controlling unit 104 may comprise two flow meters when providing a two component gas mixture to the plasma 107, one flow meter for each component in a two component gas mixture.

The gas flow controlling unit and the power supply may be electrically coupled to the electric grid e.g. via respective electric wires. Thereby the electric grid may provide power to the gas flow controlling unit and to the power supply 101.

The power supply 101 may be electrically connected to the set of electrodes 102 e.g. via electrical wires 113. Generally, the voltage required may depend on e.g. the gap between the electrodes. If the gap is smaller, the ignition voltage is also smaller. In some embodiments the power supply may be configured to supply a voltage between 300 V and 40 kV. The operation of the arc requires normally requires much lower voltages than the ignition of the plasma.

Via the electrical wires 113, the power supply 101 may provide (electric) energy to the set of electrodes 102. For example, the power supply 101 may be connected to the electrical grid from where the power supply 101 may receive electric energy. Additionally, the power supply 101 may transform the power, e.g. alternate current, received from the electric grid into a format suitable for the set of electrodes, e.g. direct current or alternating current. Thereby, the set of electrodes 102 may generate a gliding arc using either direct current (DC) or alternate current (AC). The driving frequency of the alternate current may be between 5 Hz and 2 MHz, preferably between 50 Hz and 500 kHz.

The power supply 101 may additionally control the surface temperature of a sample 112 to be treated by the at least one gliding arc plasma 107. By increasing the power from the power supply 101 to the set of electrodes 102, the surface temperature of the sample may be increased.

The gas flow controlling unit 104 may inject gas into a plasma 107 contained in a volume. Alternatively, a plasma may be created in the volume. In the above and below, a plasma 107 may be characterized as a partially ionized gas, in which a certain proportion of electrons are free rather than being bound to an atom or a molecule in the gas. The ability of positive and negative charges to move somewhat independently makes the plasma electrically conductive so that it responds strongly to electromagnetic fields. Examples of suitable gases to be fed to the discharge for use in embodiments of an apparatus described herein include air, $N_2$, $O_2$, Ar, He, Ne, $CO_2$, $H_2O$, hydro-carbons (such as methane, ethane, propane, butane, alcohols, etc.), etc. or mixtures of the above.

For example, the gas flow controlling unit 104 may inject a gas into the plasma as indicated by the arrow 194. The volume containing the plasma may be partly or wholly expanded by the set of electrodes 102 and the gas flow 194.

The gas flow controlling unit 104 may be controlled manually by a person setting the flow rate of the gas injected into the plasma 107.

The set of electrodes 102 may, for example, comprise two electrodes having a radius of axial curvature. For example, the radius of axial curvature 901 may be at least approximately 20 mm (more preferably >40 mm). Alternatively, the set of electrodes may comprise two straight electrodes. Further, the two electrodes may be positioned with a distance between approximately 0.2 mm and 20 mm (preferably 0.2 mm and 10 mm) between them at the point of minimal distance. Generally, the point of minimum distance between the electrodes corresponds to the point of ignition. However, if there is a sharply edged part of the electrode with a slightly larger gap, this may be the point of ignition. The ignition generally occurs only if the electric field is strong enough, i.e. the point of ignition is generally a location along the electrode where the electrical field between the electrodes is sufficiently strong.

In an embodiment, the set of electrodes 102 may comprise more than two electrodes e.g. three or four electrodes.

Large voltage differences (e.g. 1-40 kV) between the electrodes induce ignition of an arc discharge. The arc discharge is extended by a high speed gas flow from the gas flow controlling unit 104. The input power, provided by the power supply 101, of the arc can be high e.g. in the order of 0.2-5 kW per one gliding arc. Thereby, the input power to the at least one gliding arc plasma may be controlled such that electrons in the at least one gliding arc have high temperature, e.g. above 0.5 eV.

Figure 2:
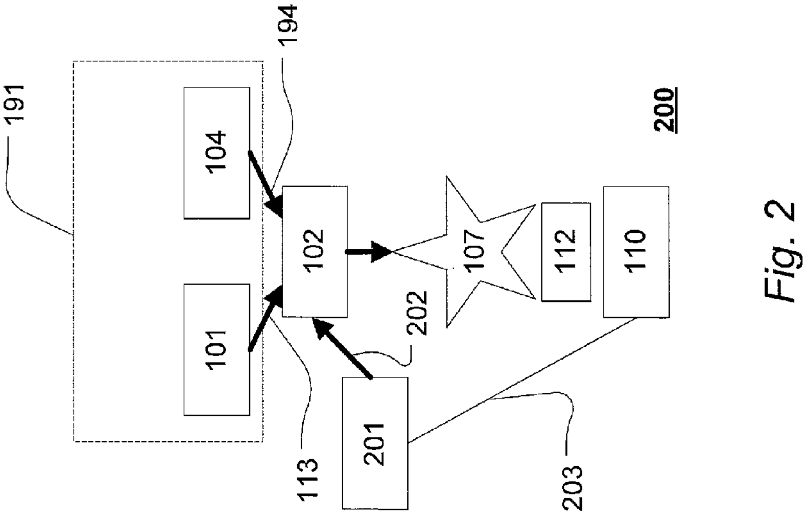
FIG. 2 shows an embodiment of a device for generating at least one gliding arc plasma and comprising a cooling unit.

FIG. 2 shows an embodiment of a device 200 for generating at least one gliding arc plasma 107 such as one gliding arc plasma or a plurality of gliding arc plasmas. The device 200 may comprise the technical features of FIG. 1.

In the device 200, each electrode in the set of electrodes may be hollow enabling passage of a fluid through the set of electrodes.

Additionally, the device 200 may comprise a cooling unit 201. The cooling unit may be fluidly coupled to the set of electrodes 102 e.g. via a tube 202 or the like. Thereby, the cooling unit 201 may cool the set of electrodes 102 e.g. by pumping a coolant through the set of electrodes 102 via the tube 202.

The cooling unit 201 may be electrically coupled to the power supply 101 via an electric wire 204 or to an electric grid (not shown).

In an embodiment, the device 200 may further comprise an actuator 110 adapted to translate a sample 112 through the plasma 107. For example, the actuator 110 may comprise an X-Y-table. The actuator 110 may be controlled manually by an operator.

Optionally, the X-Y-table of the actuator 110 may be hollow enabling a fluid to pass through the actuator 110. In this case, the cooling unit 201 may be fluidly coupled to the actuator 110 e.g. via a tube 203 or the like. Thereby, the cooling unit 201 is able to cool the actuator 110 by pumping a coolant such as water through the actuator 110.

As in FIG. 1, the device 200 is able to generate a plasma 107 and to surface treat a sample 112.

Figure 3:
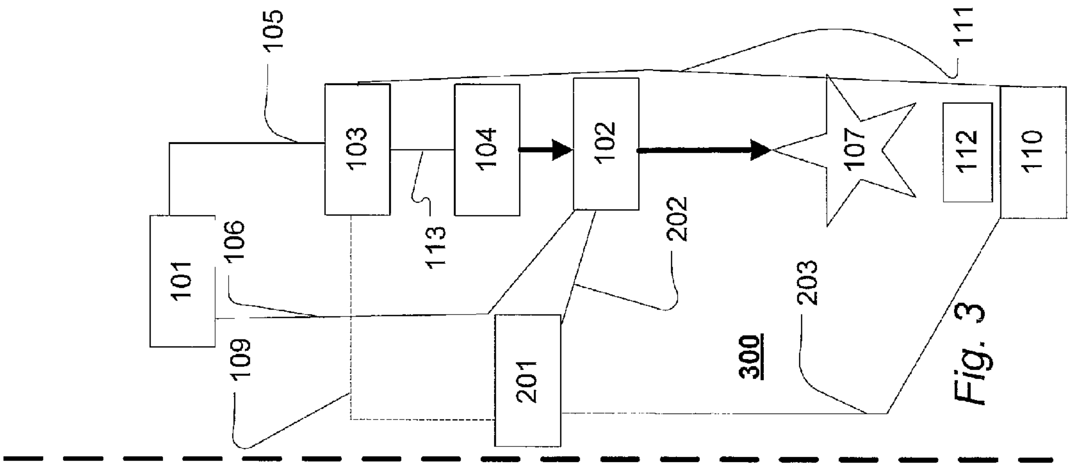
FIG. 3 shows an embodiment of a device for generating at least one gliding arc plasma comprising a control unit.

FIG. 3 shows an embodiment of a device 300 for generating at least one gliding arc plasma 107 such as one gliding arc plasma or a plurality of gliding arc plasmas. The device 300 may comprise a power supply 101, a control unit 103, at least one gas flow controlling unit 104 (e.g. one gas flow controlling unit) and a set of electrodes 102.

The power supply 101 may be electrically communicated with the control unit 103 e.g. via an electrical wire 105, such that the control unit 103 may control the power supply 101.

The control unit 103 may control the power provided to the at least one gas flow controlling unit 104 e.g. via electric wire 113.

For example, the set of electrodes 102 may be electrically coupled to the power supply 101 via e.g. an electric wire 106, and communicatively coupled to the control unit 103 via a wireless and/or wired communication link 106. The communication link may be established via e.g. an electrical wire and/or Bluetooth. Thereby, via the electric wire 105, the control unit 103 may control the frequency and/or the amplitude of the power supplied to the set of electrodes 102, and via the electric wire 106, the power supply may provide power to the set of electrodes 102.

Additionally, the control unit 103 may control the at least one gas flow controlling unit 104. The at least one gas flow controlling unit 104 may be communicatively coupled to the control unit 103 e.g. by a wireless and/or wired communication link 113. The communication link may be established via an electrical wire and/or Bluetooth. Thereby, the control unit 103 may control the amount of gas and/or the flow rate of gas injected by the at least one gas flow controlling unit 104. Thereby, the control unit 103 may comprise controlling flow of the gas used in the plasma 107 and thus, for example, the gas in the plasma may be cooled while the electron temperature is substantially maintained e.g. within +/−30%.

The at least one gas flow controlling unit 104 may inject gas into a plasma 107 contained in a volume via the set of electrodes 102. Alternatively, a plasma may be created in the volume. In the above and below, a plasma 107 may be characterized as a partially ionized gas, in which a certain proportion of electrons are free rather than being bound to an atom or a molecule in the gas. The ability of positive and negative charges to move somewhat independently makes the plasma electrically conductive so that it responds strongly to electromagnetic fields.

Figure 10:
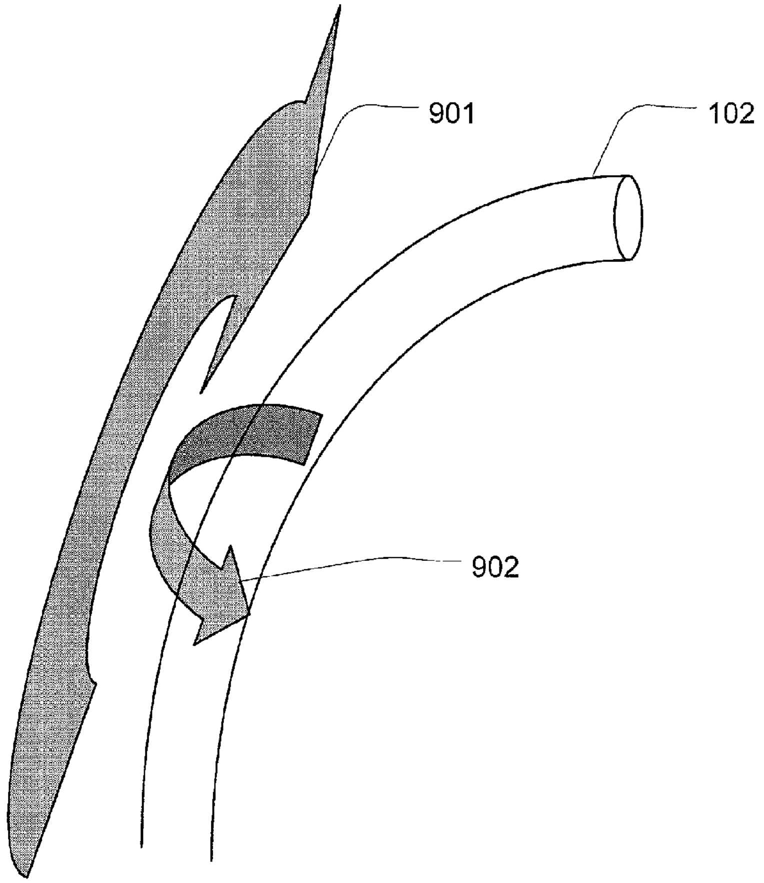
FIG. 10 shows a definition of axial and circumferential curvatures.

The set of electrodes 102 may, for example, comprise two or more electrodes having a radius of axial curvature. For example, the radius of axial curvature (see 901 in FIG. 10 for a definition of axial curvature) may be approximately more than 20 mm (preferably >40 mm). Alternatively, the set of electrodes may comprise two straight electrodes. Further, the two electrodes may be positioned with a distance between approximately 0.2 mm and 20 mm (preferably 0.2 mm and 10 mm) between them at the point of minimal distance.

Large voltage differences (e.g. 1-40 kV) between the electrodes induces ignition of an arc discharge. The arc discharge is extended by a high speed gas flow. The input power of the arc can be high e.g. in the order of 0.2-5 kW per one gliding arc. Thereby, the input power to the at least one gliding arc plasma may be controlled such that electrons in the at least one gliding arc have high temperature, e.g. above 0.5 eV. Thereby, the control unit 103 may be adapted to control the input power to the at least one gliding arc plasma via the set of electrodes 102 such that electrons in the at least one gliding arc have high temperature, e.g. above 0.5 eV, and such that the energy density in the at least one gliding arc is high (typically at least 200 W, preferably at least 400 W).

In an embodiment, the device 300 may further comprise a cooling unit 201 which may be controlled by the control unit 103. For example, the cooling unit 201 may be communicatively coupled to the control unit 103 e.g. by a wireless and/or wired communication link 109 such as an electrical wire and/or Bluetooth.

The cooling unit 201 may be fluidly connected to the set of electrodes 102 via e.g. a tube 202 or the like. The electrodes 102 may be hollow to enable a fluid to pass through them. Thereby, the cooling unit 201 may be adapted to provide a coolant to the set of electrodes 102. The coolant may, for example, be water, oil or air. Generally, the coolant may be an insulating fluid and/or a fluid with high resistance. Generally, in some embodiments a gas may be fed through the tubes of the electrodes for cooling, and all or a part of the gas may subsequently be fed to the plasma.

The cooling unit 201 may optionally be fluidly connected to the X-Y table 110 via a tube 203.

In an embodiment, the device 300 may further comprise an actuator 110 adapted to translate a sample 112 through the plasma 107. For example, the actuator 110 may comprise an X-Y-table. The actuator 110 may be communicatively coupled to the control unit 103 e.g. by a wireless and/or wired communication link 111 such as an electrical wire and/or Bluetooth. Thereby, the control unit 103 is adapted to control the actuator 110 such as for example the speed by which the sample 112 is translated through the plasma 107.

Figure 4:
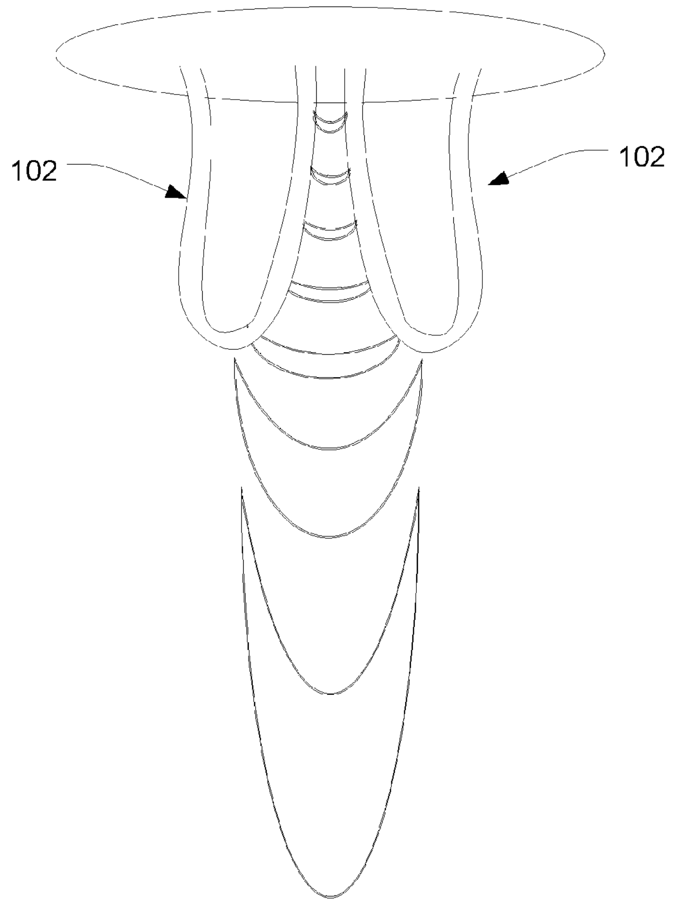
FIG. 4 shows an embodiment of a set of electrodes in which the electrodes are formed as hollow tubes.

FIG. 4 shows an embodiment of a set of electrodes 102 in which the electrodes 102 are formed as hollow tubes enabling a fluid to circulate within them. The hollow electrodes 102 may be fluidly connected to the cooling unit 201 so as to enable the coolant to be circulated in the electrodes 102. Thereby, the control unit 103 of FIG. 3 may be adapted to control the temperature of the electrodes by circulating the coolant in the hollow set of electrodes 102.

In an embodiment, the hollow tubes of the electrodes 102 may be thin, for example having an outer diameter of 3 mm and an inner diameter of 2 mm. Thin electrodes may provide a more efficient use of the power supplied from the power supply 101 to the electrodes because if the point of arc ignition is sharply edged, the intensity of the electric field generated by the electrodes is higher, and a discharge, ignited by the electrodes, is ignited with a lower voltage. Generally the radius of curvature of the portion of the surface (measured in a plane normal to the longitudinal direction of the electrode, also referred to as circumferential curvature) at the point of arc ignition should be no more than 3 mm.

Alternatively or additionally, if the circumferential curvature (see 902 in FIG. 10 for a definition of circumferential curvature) of the electrodes is small, the intensity of the electric field generated by the electrodes is also higher, and the discharge, ignited by the electrodes, is ignited with a lower voltage.

Generally, a power supply 101 may provide a higher power if the required voltage is lower. Therefore, by using thin electrodes, a given power supply 101 may provide a higher power than if thick electrodes are used.

Additionally, as the cost of a power supply 101 increases with the maximum deliverable power in the specification, it may be desirable to reduce the required voltage which may be achieved using thin electrodes.

In an embodiment, the hollow tubes of the electrodes 102 may be thick, for example having an outer diameter of 6 mm and an inner diameter of 4 mm. Increasing the inner diameter of the hollow set of electrodes 102 may enable more efficient cooling due to the possibility of using a higher coolant flow rate in a tube with a larger inner diameter. More efficient cooling enables a higher electric energy to be delivered to the plasma than the thinner electrodes because the resistance of the electrodes increases with temperature, and thus the resistance of the thick electrodes, which are better cooled, is smaller than the thin electrodes. When the resistance is higher, more electrical energy is consumed for heating. Thereby, a higher plasma energy may be achieved which may result in better surface treatment.

In an embodiment, one electrode may be thick and one electrode may be thin.

Figure 5:
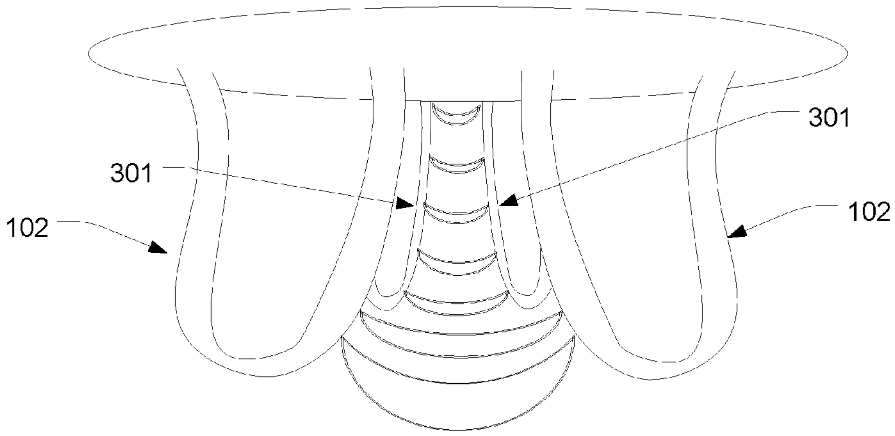
FIG. 5 shows an embodiment of a set of electrodes comprising hollow tube electrodes with blades.

FIG. 5 shows an embodiment of a set of electrodes 102 comprising attachments 301. The attachments 301 may, for example, be blade-shaped. By including attachments 301 in the electrodes 102, the voltage required for generating the plasma may be reduced as disclosed above under thin electrodes. Thus, the voltage required for generating a plasma using thick electrodes may be lowered by including attachments 301.

In an embodiment, the attachments are rigidly coupled to the electrodes e.g. via welding or the like.

The blades 301 may be made of the same material as the electrodes 102 e.g. copper or aluminum, stainless steel, tungsten or the like. The blades 401 may be welded to the electrodes 102 or the electrodes 102 and blades 301 may be cast into a single piece. Alternatively, the blades may be made of a different material than the electrodes.

In an embodiment, the blades 301 may be included in a hollow set of electrodes i.e. electrodes through which the coolant may be circulated. Optionally, the blades 301 may also be hollow and fluidly connected to the hollow set of electrodes 102, e.g. via one or more holes, thereby enabling coolant to circulate through the blades and thus enabling cooling of the blades 301.

Generally, the blades 301 may be designed such that they enable a lowering of the ignition voltage for the plasma, whereby a condition comprising a high electron temperature (e.g. greater than 0.5 eV) and a high input power to at least one gliding arc (e.g. greater than 0.2 kW and below 5 kW) may be established. The design of the attachments may include using sharp edged blades and/or blades with a small radius of curvature (i.e. small diameter no more than 4 mm (if radius no more than 2 mm)) so that high electric field can be generated at the electrodes 301.

Additionally or alternatively, the electrodes may be designed to include sharp edged and/or a small radius of curvature (i.e. small diameter) so that a high electric field can be generated at the electrodes 102.

The sharp edges of the attachments 301 and/or the electrodes may ensure a low ignition voltage, thereby enabling a high energy input to the plasma 107.

Figure 6:
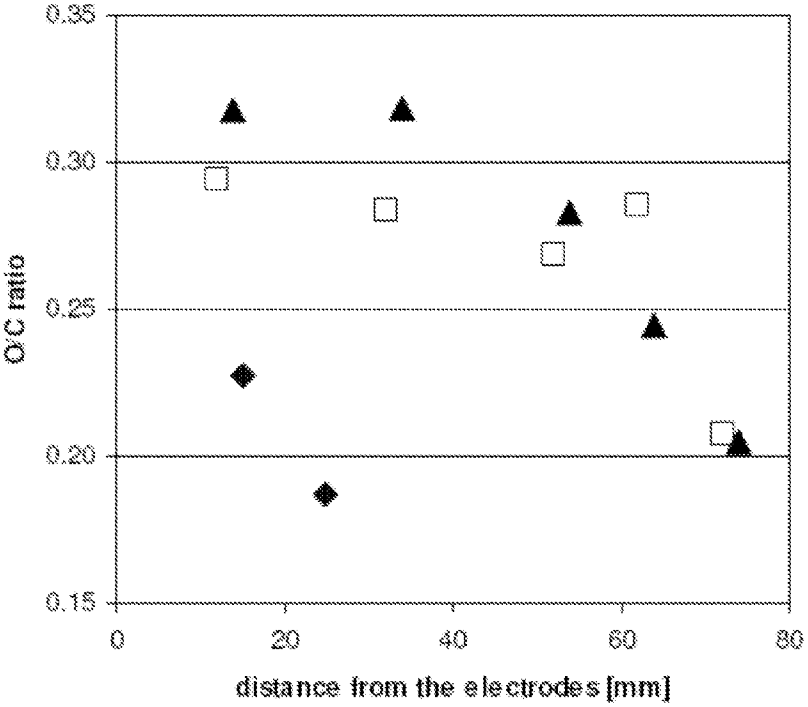
FIG. 6 shows the O/C ratio at the surface of a polyester sample after plasma treatment for a number of devices.

FIG. 6 shows the atomic composition at the surface of a polyester sample 112 after treatment with a prior art device represented by solid diamonds, a device according to FIG. 4 comprising thin tubes (in order to achieve a low ignition voltage) represented by open squares, and a device according to FIG. 4, thick tubes and blades (in order to achieve a low ignition voltage and a low resistance in the electrodes) represented by solid triangles, measured by means of x-ray photoelectron spectroscopy. When the oxygen to carbon ratio (O/C ratio) increases, it is an indication of better performance of a device due to more oxygen from the plasma having reacted with the plastic of the sample 112. Thus, from FIG. 6 it is seen that the gliding arc plasma system with blades is most efficient in oxidizing the polyester surfaces of the plastic sample 112. Further, it is seen that the gliding arc plasma system comprising cooled electrodes is more efficient than the prior art device.

Figure 7:
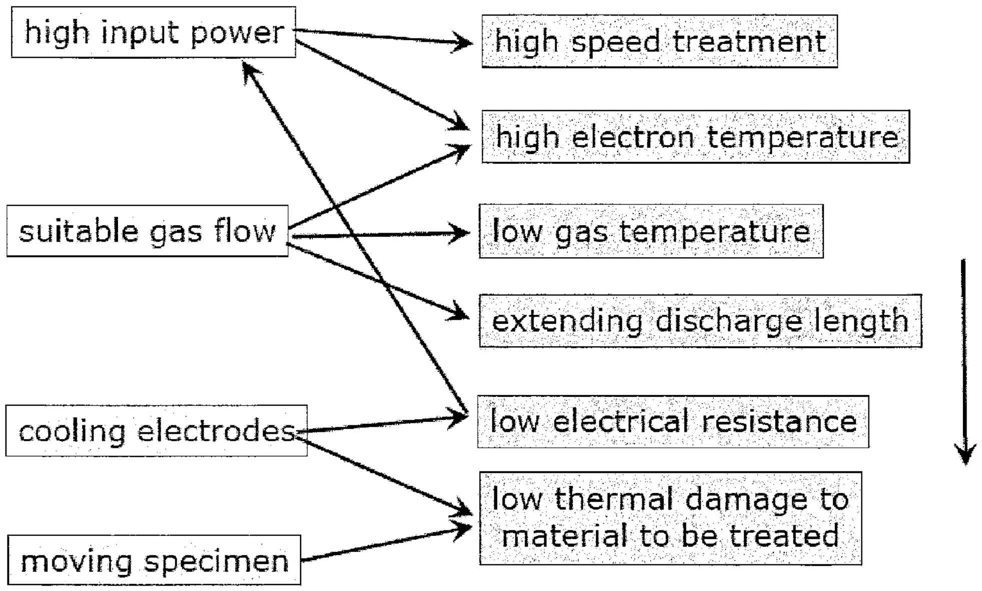
FIG. 7 shows how parameters controlled by the device affect parameters of the plasma and a sample treated by the plasma.

FIG. 7 shows how parameters controlled by the device 100, 200, 300 affects parameters of the plasma 107 and a sample 112 treated by the plasma.

For example, if the control unit 103 increases the power applied to the electrodes 102, then the energy density of the plasma 107 increases and therefore, the device 100, 200, 300 is able to increase the speed of translating the sample 112 through the plasma 107 in order to treat the sample 112.

Further, increasing the power applied to the electrodes 102 provides for a higher electron temperature in the plasma and higher plasma density and thereby a faster treatment of the sample 112 surface.

If the at least one gas flow controlling unit 104 is able to provide a suitable gas flow to the plasma 107, the device 100, 200, 300 may provide a higher electron temperature and a lower gas temperature in the plasma 107. When the flow rate is increased, the gas and electrons are cooled more at and around the arc ignition point e.g. within a perimeter of e.g. a radius of 20 mm around the arc ignition point. The electron temperature may remain substantially (e.g. within 30%) unchanged beyond this perimeter, while the gas temperature decreases furthermore beyond the perimeter.

Additionally, by having the at least one gas flow controlling unit 104 providing a suitable gas flow, the device 100, 200, 300 may increase the discharge length of the plasma. If the flow rate is too low, it cannot extend (blow out) the discharge well and thus the extension of the discharge is short. If the flow rate is too high, the plasma (gas and electrons) are cooled down too much to extend the discharge. Therefore, a suitable gas flow exists which may provide a discharge length of an appropriate size.

The gas flow rate has to be low enough to sustain a high temperature of the arc discharge. Further, by providing a high gas flow, corrosion of the electrodes may be impeded or prevented.

If the cooling unit 201 increases cooling of the electrodes 102, then the electrical resistance of the electrodes decreases. Thereby is achieved that a higher power may be applied to the electrodes 102 without risking damaging the electrodes 102. Further, lower resistance results in lower power loss.

Further, by cooling the electrodes 102, the surface temperature of the sample 112 may be controlled. By cooling the electrodes 102, low thermal damage to the sample 112 being treated is achieved because thermal radiation from the electrodes to the sample 112 is reduced.

The actuator 110 may control the surface temperature of the sample 112. If the actuator 110 increases the speed of the sample 112 through the plasma 107, low thermal damage to the sample 112 may be achieved because an irradiated part of the sample 112 may cool down while another part of the sample 112 subsequently becomes irradiated.

The surface temperature of the sample 112 may be controlled by changing the distance between the sample and the at least one gliding arc source.

The temperature of the sample 112 may be decreased by placing the sample on a cooled sample holder.

Figure 8:
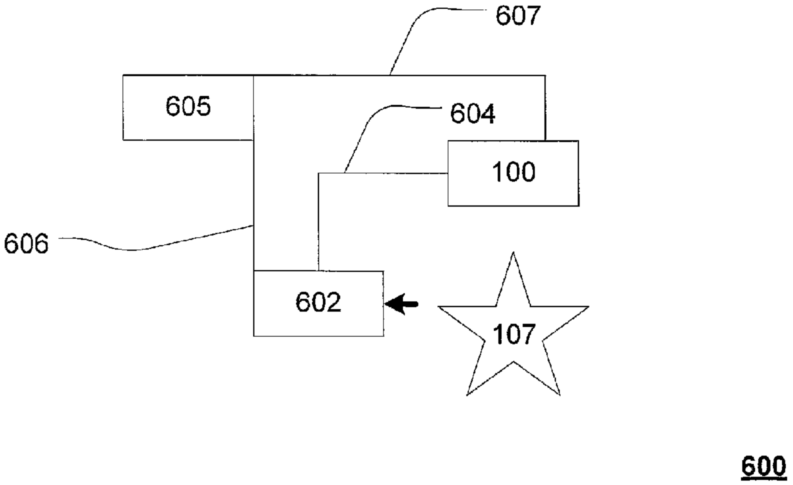
FIG. 8 shows an embodiment of a device 600 comprising a feedback loop for optimizing control of a plasma 107.

FIG. 8 shows an embodiment of a device 600 comprising a feedback loop for optimizing control of a plasma 107.

The temperature of the gas in the plasma 107 may be estimated using the rotational temperature obtained from optical emission (e.g. OH emission) in the gas e.g. as disclosed in C. O. Laux, T. G. Spence, C. H. Kruger, and R. N. Zare, "Optical diagnostics of atmospheric pressure air plasmas", Plasm. Source Sci. Technol. 12 (2003), p 125-138.

The rotational temperature may be detected by an optical detector 602 by observing the optical emission from the plasma 107.

In an embodiment, the device 600 comprises a computational unit 605 adapted to analyze the rotational spectrum.

The computational unit 605 may be communicatively connected to the optical detector 602 and the control unit 103 of the device 200 via respective wired and/or wireless communication links 606, 607 such as electrical wires and/or Bluetooth communication links.

The computational unit 605 may receive a rotational spectrum from the optical detector 602 via connection 606, e.g. via an electrical wire. Based on the rotational spectrum received, the computational unit 605 may estimate a rotational temperature.

The rotational temperature may be representative of the molecule/gas temperature in the plasma 107, and thus, the computational unit 605 may be adapted to determine a temperature of the gas (ions and/or molecules) in the plasma based on the rotational temperature.

Based on the estimated gas temperature in the plasma, the computational unit 605 may be adapted to transmit a feedback signal to the control unit 103 of the device 200 via communication link 607 in order to e.g. have the control unit 103 to increase the gas flow to the plasma 107 via the at least one gas flow controlling unit 104 and/or to increase the electric current in the electrodes, etc., in order to optimize the plasma 107 according to predetermined plasma values stored in the computational unit 107 e.g. a rotational temperature of 2000K at a flow rate of 30 L/min (corresponding to a gas velocity of 81 m/s+/−10%).

Further, the rotational temperature may be representative of the electron temperature at the arc of the electrodes and therefore, the computational unit 605 may be adapted to determine the electron temperature at the arc of the electrodes based on the rotational temperature.

Figure 9:
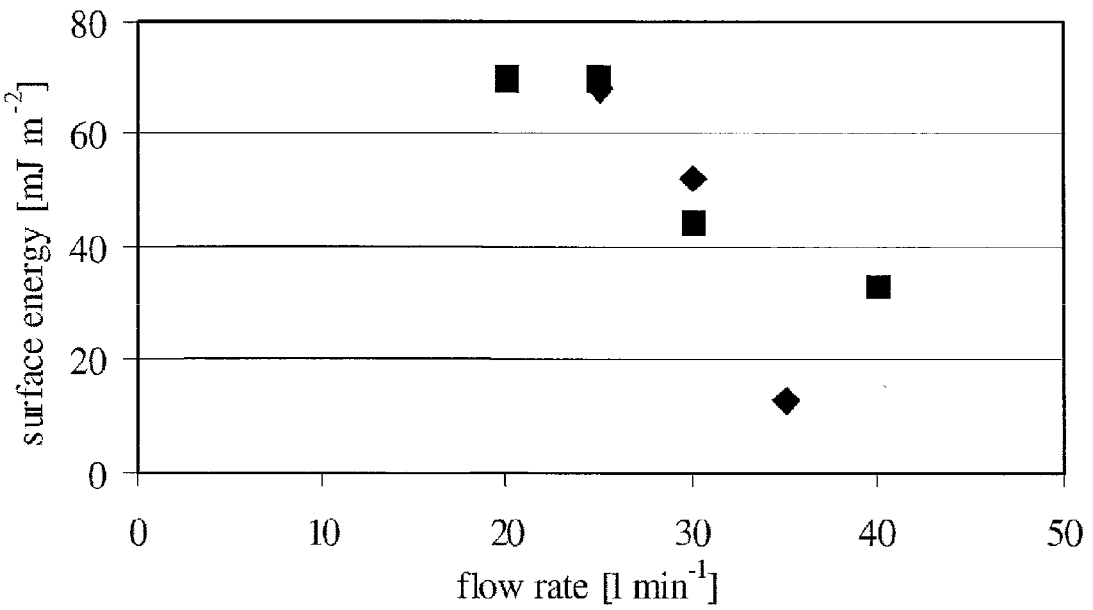
FIG. 9 shows the polar component of the surface energy of a polyester sample versus the flow rate of the gas (air) supplied by the device to the plasma.

FIG. 9 shows the surface energy of a sample 112 versus the flow rate of the gas supplied by the device 200, 600 to the plasma 107. In FIG. 8, the distance between the sample and the location of the arc ignition was 65 mm. The higher the polar component of the surface energy of the sample 112 the better for adhesion, because more amounts of polar functional groups are created, which efficiently interact with adhesives. Thus, from FIG. 8 it is seen that a flow-rate of approximately 20-25 L/min (corresponding to a gas velocity of approximately 58-68 m/s+/−10%) is optimal for this type of device. A flow-rate of 15-30 L/min (corresponding to a gas velocity of approximately 41-81 m/s+/−10%) corresponds to a rotational temperature of 2000-5000K, and therefore such a rotational temperature may be optimal. Therefore, a rotational temperature above approximately 2000K (i.e. 3000K+/−10%), corresponding to a flow rate below 30 L/min (corresponding to a gas velocity of approximately 81 m/s+/−10%), may be seen as optimal. Further, it is noted that a flow rate of approximately 40 L/min (corresponding to a gas velocity of approximately 108 m/s+/−10%) corresponds to a rotational temperature of approximately 1800K.

Besides the flow rate, other parameters which may be controlled are the input power to the gliding arc and temperature of the set of electrodes. These parameters (flow rate, input power and temperature) may affect the parameters shown in FIG. 6. Examples of values of the controlled parameters may be input power above 0.4 kW, flow rate/gas velocity lower than 81 m/s+/−10%. Additionally, the temperature of the bulk part of the electrode may be defined using the temperature coefficient $\alpha$ of the electrode material, Assuming that maximum acceptable resistance of the bulk part of the electrodes is 2 times that of room temperature, the maximum acceptable temperature is approximately $1/\alpha$ degree. For example, if the electrode is made of copper, $\alpha$=0.393% per degree C. and thus the maximum acceptable temperature is approximately 254 degree C.

In an embodiment, the gliding arc may be perpendicular to the sample surface to be treated.

In an embodiment, the gliding arc generated by the electrodes 102 may be tilted with respect to the sample surface such that the gliding arc plasma is at a non-perpendicular angle to the sample 112. For example, the gliding arc plasma 107 may be tilted an angle between 0 and 90° (preferably no less than 5°) with respect to the sample 112 surface to be treated. This may for example be achieved by angling the set of electrodes with respect to the sample 112 surface to be treated. Thereby, the sample surface area treated increases thus increasing effectiveness of the device 100, 200, 300.

In general, any of the technical features and/or embodiments described above and/or below may be combined into one embodiment. Alternatively or additionally any of the technical features and/or embodiments described above and/or below may be in separate embodiments. Alternatively or additionally any of the technical features and/or embodiments described above and/or below may be combined with any number of other technical features and/or embodiments described above and/or below to yield any number of embodiments.

Figure 11A:
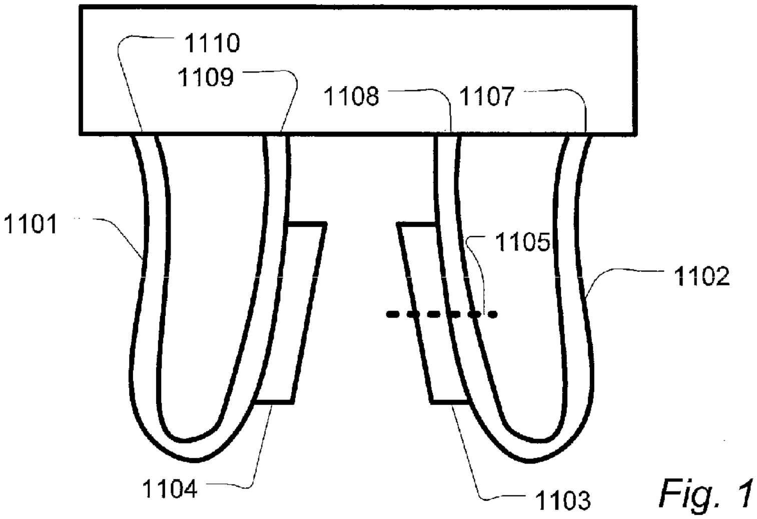
FIG. 11*a-b* shows a set of electrodes comprising electrode protrusions.
Figure 11B:
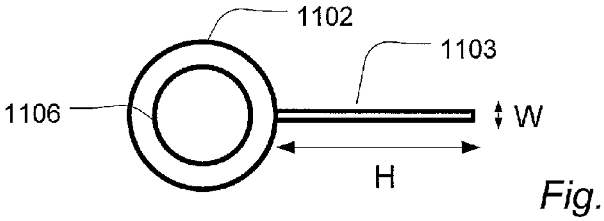
Figure 12B:
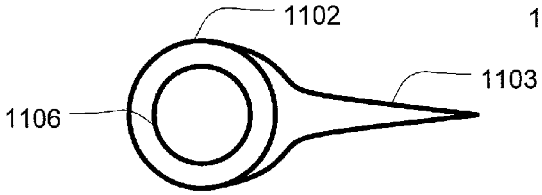
FIG. 12*a-d* shows different tube and electrode protrusion designs.
Figure 12A:
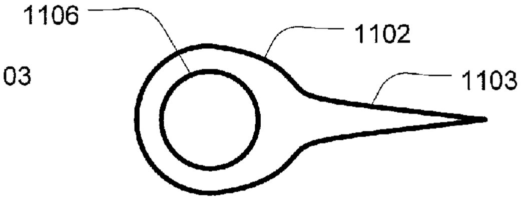
Figure 12C:
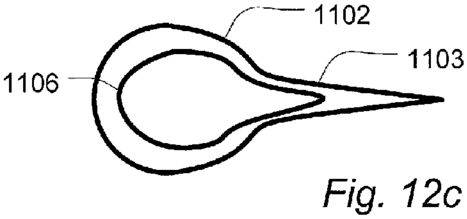
Figure 12D:
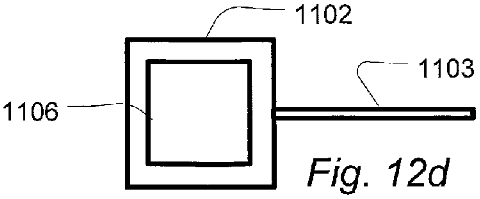

FIG. 11*a-b* shows a set of electrodes comprising electrode protrusions. Each electrode 1101 1102 comprises a tube having an approximately U shape. Each tube comprises a first end 1107 1109 where a coolant enters the electrode and a second end 1108 1110 where the cooling exits the electrode, where the centre of the cross section at the first end is displaced relative to the centre of the cross section at the second end. Each electrode comprises an electrode protrusion 1103 1104 protruding from the surface of the tubes. Each electrode protrusion 1103 1104 protrudes approximately towards the other electrode and/or towards the other electrode protrusion. FIG. 11*b* shows a cross-section of the electrode 1102 at the plane 1105. The electrode 1102 comprises a circular tube having an inner shape 1106 and an outer shape 1102. The electrode protrusion 1103 is blade shaped. The electrode protrusion 1103 protrudes with a height H in the direction towards the other electrode 1101. The electrode protrusion 1103 has a width W in the direction perpendicular to the height in the cross section 1105. In FIG. 11*b* the protrusion has two rounded edges each having a radius of curvature of less than 3 mm.

The electrode protrusion e.g. electrode attachment, may protrude with a height of at least 1 mm, 2 mm, 5 mm, 1 cm, 2 cm or 5 cm. The electrode attachment may protrude with a height no more than 10 cm, 5 cm, 2 cm, 1 cm, or 5 mm.

The electrode protrusion e.g. electrode attachment, may have a width of at least 0.1 mm, 0.2 mm, 0.5 mm, 1 mm, 1 cm or 2 cm. The electrode protrusion may have a width of no more than 10 cm, 5 cm, 2 cm, 1 cm, 5 mm, 2 mm, or 1 mm.

FIG. 12*a-d* shows different tube and electrode protrusion designs.

Figure 13:
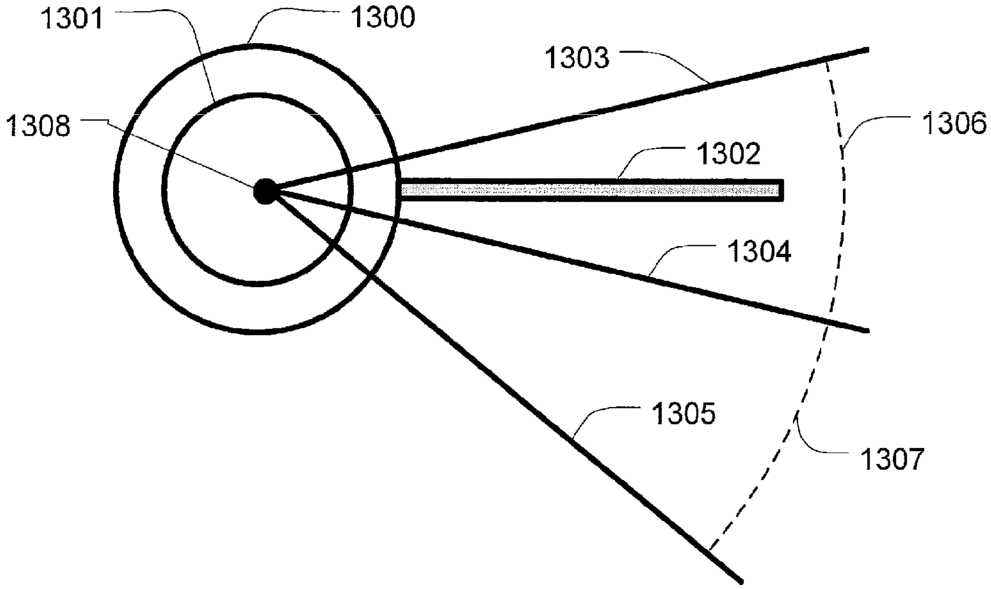
FIG. 13 shows an electrode comprising a tube having and electrode protrusion.

FIG. 13 shows an electrode comprising a tube having and electrode protrusion. Shown is a cross section of the tube being perpendicular to the longitudinal direction of the tube, at a part of the tube comprising the electrode protrusion, where the electrode protrusion has a shape such that a first surface area defined between a first line 1303 and a second line 1304 originating in the centre 1308 of said cross section is at least a factor A larger than a second surface area defined between said second line 1304 and a third line 1305 originating in said centre 1308, wherein the angle 1306 between said first and said second line 1303 1304, and said second line 1304 and said third line 1305 is B, wherein the first and the second line 1303 1304 is positioned so that the first surface area comprises the electrode protrusion 1302, and the third line 1305 is positioned so that the first surface area and the second surface area does not overlap.

A may be chosen from approximately 1.1, 1.5, 2, 3, 4, 5, or 10, and B may be chosen from approximately 180 degrees, 135 degrees, 90 degrees, 45 degrees, 30 degrees, 20, degrees, 10 degrees, or 5 degrees.

Figure 14:
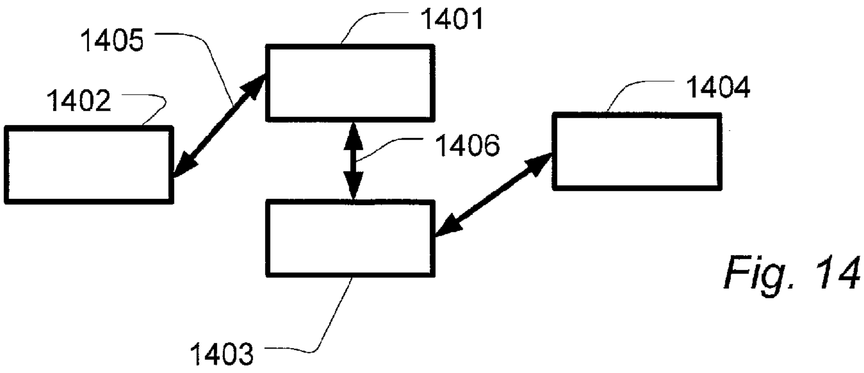
FIG. 14 shows a part of an apparatus for treating a surface with a gliding arc according to an embodiment of the present invention.

FIG. 14 shows a part of an apparatus for treating a surface with a gliding arc according to an embodiment of the present invention. The apparatus comprises a computational unit 1401 communicatively coupled to the control unit 1403 via a first communication link 1406 and to a sensor 1402 via a second communication link 1405, wherein said sensor 1402 is adapted to measure a parameter indicative of the resistance of at least one of the electrodes, and where the computational unit 1401 is adapted to calculate a feedback signal based on the measured parameter wherein the computational unit 1401 is further adapted to transmit the feedback signal to the control unit 1403 wherein the control unit 1403 is adapted to control the cooling unit 1404 responsive to the received feed back signal such that the cooling unit 1404 is controllable via a feedback loop.

Figure 15:
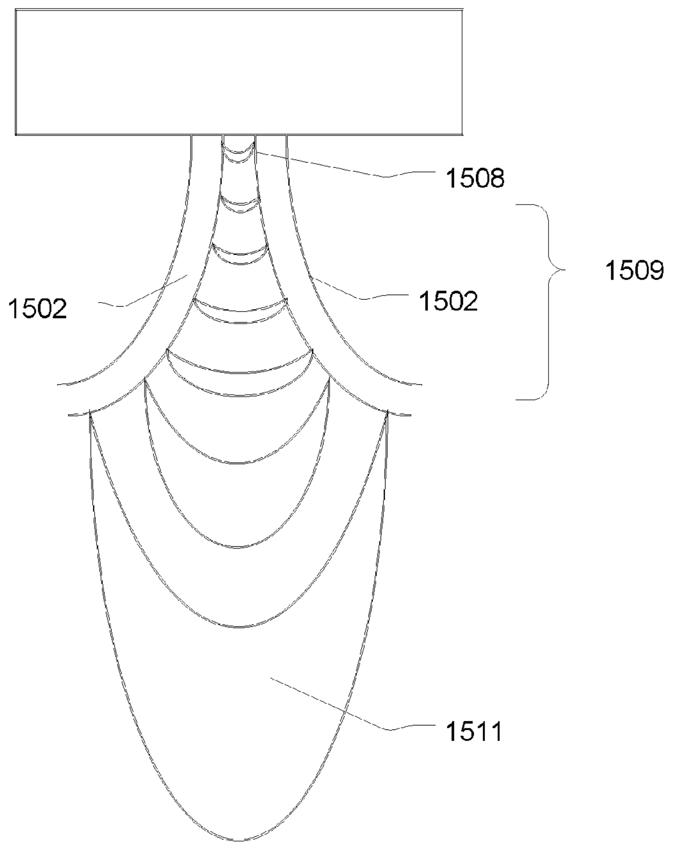
FIG. 15 shows an embodiment of a device for generating at least one gliding arc plasma.

FIG. 15 illustrates operation of an embodiment of a device for generating at least one gliding arc plasma. The shape and size of the electrodes 1502 facing the plasma are interesting features of the apparatus. At the point of discharge ignition 1508, the electrodes 1502 should, at least at their side facing the respective other electrode, be thin enough and/or have a radius of curvature (in a plane normal to the longitudinal direction of the electrode) small enough, and the gap between the electrodes should be small enough to ignite a discharge with low voltage. In the region 1509 different from the ignition region 1508 (also referred to as region of discharge extension), the gap between the electrodes gradually increases. As long as the discharge bridges the electrodes, the current flows in the plasma, which increases the energy. As the gap size increases with increasing distance from the point of ignition, when a certain gap size is reached, the discharge cannot sustain the arc (equilibrium) condition and changes to a non-equilibrium plasma 1511, which is used for the processing.

Figure 16:
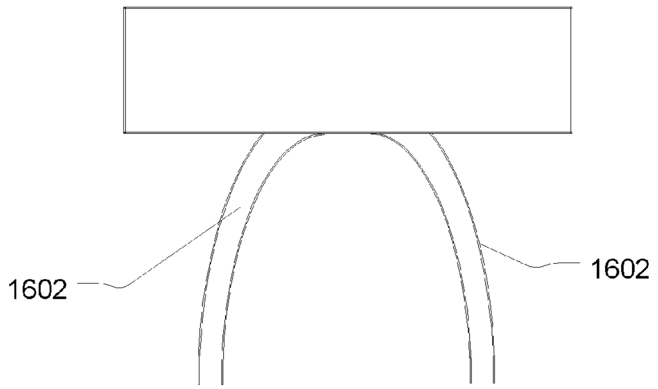
FIG. 16 illustrates a different embodiment of a device for generating at least one gliding arc plasma with electrodes 1602 having a convex shape

FIG. 16 illustrates a different embodiment of a device for generating at least one gliding arc plasma with electrodes 1602 having a convex shape.

It will be appreciated that, in some embodiments of the apparatus described herein, the properties and/or the shape of the gliding arc plasma may be further modified by applying magnetic field and/or any other known technologies for any specific applications.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. An apparatus for treating a surface, comprising at least one gliding arc source comprising at least one gas flow controlling unit 104 and a set of elongated electrodes 102 for providing a plasma;

a cooling unit for providing a cooling fluid; and a high voltage power supply for generating a discharge;

wherein at least one of the electrodes comprises a tubular portion having a first end and a second end, fluidly coupled to the cooling unit 201, wherein the tubular portion defines a longitudinal direction of the electrode, wherein the tubular portion is configured to receive, during operation, the cooling fluid at said first end and discharge the cooling fluid at said second end, wherein the centre of the cross-section of the tube at the first end is displaced relative to the centre of the cross-section of the tube at the second end, wherein the electrode further comprises an outer surface comprising a portion facing the other one of the electrodes, said portion of the outer surface being curved in a plane normal to said longitudinal direction and having a radius of curvature less than 3 mm, wherein the apparatus further comprises a control unit 103 adapted to control at least the cooling unit, and wherein the apparatus further comprises a computational unit communicatively coupled to the control unit and to a sensor, wherein said sensor is adapted to measure a parameter indicative of the resistance of at least one of the electrodes, and where the computational unit is adapted to calculate a feedback signal based on the measured parameter; and wherein the control unit is adapted to control the cooling unit responsive to the calculated feedback signal.

2. An apparatus according to claim 1, wherein the tubular portion comprises, at least along a portion of its outer surface, a protrusion configured to lower the voltage applied to the electrodes required to ignite the plasma, said protrusion comprising said portion of the outer surface.

3. An apparatus according to claim 2, wherein each electrode of the set of electrodes 102 comprises a protrusion.

4. An apparatus according to claim 2, wherein the protrusion is blade-shaped.

5. An apparatus according to claim 2, wherein the protrusion is hollow and fluidly coupled to the cooling unit 201 via the said tubular portion.

6. An apparatus according to claim 1, wherein the at least one gas flow controlling unit 104 and the set of electrodes 102 are controllable to provide a plasma comprising a rotational temperature at the point of arc ignition above approximately 2000 K.

7. An apparatus according to claim 1, wherein the control unit 103 is communicatively coupled to the gas flow controlling unit 104 and to the set of electrodes 102 via respective communication links 106, 113 such that the control unit 103 is adapted to control the gas flow controlling unit 104 and the set of electrodes 102 via said respective communication links.

8. An apparatus according to claim 1 wherein the cooling unit 201 is communicatively coupled to the control unit 103 via a communication link 109 such that the control unit 103 is adapted to control the cooling unit 201.

9. An apparatus according to claim 1, wherein the set of electrodes 102 comprises an electrode attachment 301.

10. An apparatus according to claim 9, wherein each electrode in the set of electrodes 102 comprises an attachment 301.

11. An apparatus according to claim 9, wherein at least one electrode attachment 301 are blade-shaped.

12. An apparatus according to claim 9 comprising hollow electrodes fluidly coupled to the cooling unit 201, and wherein the electrode attachments 301 are hollow and fluidly coupled to the cooling unit 201 via the hollow set of electrodes 102.

13. An apparatus according to claim 1, further comprising an actuator no adapted to move a sample through the plasma 107.

14. An apparatus according to claim 1, wherein the at least one gas flow controlling unit 104 is adapted to provide a gas flow of such a magnitude that the extension length of the gliding arc discharge is within the range 15 mm to 150 mm.

15. An apparatus according to claim 1, further comprising a computational unit 605 communicatively coupled to the control unit 103 via communication link 607 and to an optical detector 602 via communication link 606, and adapted to calculate a rotational temperature of the plasma 107.

16. An apparatus according to claim 15, wherein the computational unit 605 is adapted to calculate a feedback signal based on a rotational temperature received from the optical detector 602.

17. An apparatus according to claim 16, wherein the computational unit 605 is further adapted to transmit the feedback signal to the control unit 103 such that the plasma 107 is controllable via a feedback loop.

18. An apparatus according to claim 1, wherein the plasma 107 is tilted with respect to the sample 112 between 0 and 90°.

19. An apparatus according to claim 18, wherein the tilt angle is no less than 5°.

20. An apparatus according to claim 1, configured to feed gas through the electrodes as a cooling fluid and to subsequently feed at least a part of the gas into the plasma.

21. A method of treating a surface with at least one gliding arc source comprising:

controlling the gas flow controlling unit 104 of the apparatus of claim 1; and controlling the set of electrodes 102 of the apparatus; and providing a plasma 107 via the at least one gas flow controlling unit 104 and the set of electrodes 102; and controlling the plasma 107 to comprise a rotational temperature at the point of arc ignition above approximately 2000 K.

22. A method according to claim 21, wherein the controlling of the at least one gas flow controlling unit 104 and the set of electrodes 102 is performed via the control unit 103 communicatively coupled to the at least one gas flow controlling unit 104 and the set of electrodes 102 via respective communication links 106, 113.

23. A system for treating a surface with a at least one gliding arc source comprising an apparatus according to claim 1 and a sample 112, wherein the apparatus is adapted to provide a plasma 107 to surface treat the sample 112.

24. An apparatus for treating a surface, comprising:

at least one gliding arc source, comprising at least one gas flow controlling unit 104 and a set of electrodes 102 for providing a plasma;

a cooling unit 201 for supplying a cooling fluid;

a control unit 103 adapted to control at least the cooling unit; and a sensor adapted to measure a parameter indicative of the resistance of at least one of the electrodes; and a computational unit communicatively coupled to the control unit and to the sensor;

wherein at least one of the electrodes comprises a tubular portion having a first end and a second end, fluidly coupled to the cooling unit 201, wherein the tubular portion defines a longitudinal direction of the electrode, wherein the tubular portion is configured to receive, during operation, the cooling fluid at said first end and discharge the cooling fluid at said second end, wherein the centre of the cross-section of the tube at the first end is displaced relative to the centre of the cross-section of the tube at the second end; wherein the computational unit is adapted to calculate a feedback signal based on the measured parameter, so as to control a maximum temperature of a bulk part of the electrodes to not exceed a room temperature by more than a predetermined multiple of an inverse of a temperature coefficient indicative of a linear relationship between the resistance of the electrode and the temperature; and wherein the control unit is adapted to control the cooling unit responsive to the calculated feedback signal.

* * * * *